United States Patent
Chang et al.

(10) Patent No.: US 11,018,801 B2
(45) Date of Patent: May 25, 2021

(54) METHOD FOR PERFORMING BIT LEVEL MANAGEMENT IN A WIRELESS LOCAL AREA NETWORK SYSTEM, AND ASSOCIATED TRANSMITTER AND RECEIVER

(71) Applicant: Realtek Semiconductor Corp., HsinChu (TW)

(72) Inventors: Chung-Yao Chang, Hsinchu County (TW); Wen-Yung Lee, Hsinchu (TW)

(73) Assignee: Realtek Semiconductor Corp., HsinChu (TW)

( * ) Notice: Subject to any disclaimer, the term of this patent is extended or adjusted under 35 U.S.C. 154(b) by 0 days.

(21) Appl. No.: 16/420,204

(22) Filed: May 23, 2019

(65) Prior Publication Data

US 2020/0112387 A1  Apr. 9, 2020

(30) Foreign Application Priority Data

Oct. 8, 2018  (TW) ................................ 107135332

(51) Int. Cl.
*H04L 1/00* (2006.01)
*H04L 25/02* (2006.01)
*H04L 5/00* (2006.01)
*H04W 84/12* (2009.01)

(52) U.S. Cl.
CPC .......... *H04L 1/0008* (2013.01); *H04L 1/0011* (2013.01); *H04L 1/0045* (2013.01); *H04L 5/0046* (2013.01); *H04L 25/0202* (2013.01); *H04W 84/12* (2013.01)

(58) Field of Classification Search
CPC ... H04L 1/0008; H04L 5/0046; H04L 1/0011; H04L 1/0045
See application file for complete search history.

(56) References Cited

U.S. PATENT DOCUMENTS

| | | | |
|---|---|---|---|
| 8,457,045 B2* | 6/2013 | Jung | H04W 72/005 370/328 |
| 2003/0014715 A1 | 1/2003 | Lobinger | |
| 2005/0198391 A1* | 9/2005 | Coldren | H04L 27/10 709/246 |
| 2009/0098892 A1* | 4/2009 | Trogolo | H04L 69/22 455/466 |
| 2009/0148053 A1* | 6/2009 | Cheng | H04N 19/60 382/232 |

(Continued)

*Primary Examiner* — Yemane Mesfin
*Assistant Examiner* — Henry Baron
(74) *Attorney, Agent, or Firm* — Winston Hsu

(57) ABSTRACT

A method for performing bit level management in a wireless local area network (WLAN) system, transmitter and receiver are provided. The method includes: calculating respective bit counts of one or more padding fields located in one or more locations within a packet in a transmitter within the WLAN system, respectively; and according to the respective bit counts of the one or more padding field, filling one or more sets of valid data corresponding to at least one predetermined bit count into the one or more padding fields, to replace one or more sets of redundant data. In addition, when a receiver within the WLAN system receives the packet that has the one or more sets of valid data, the WLAN system utilizes the one or more sets of valid data to enhance overall performance of the WLAN system.

17 Claims, 7 Drawing Sheets

(56) References Cited

U.S. PATENT DOCUMENTS

2010/0329308 A1* 12/2010 Kim ..................... H03M 13/11
375/130
2012/0195302 A1* 8/2012 Park ..................... H04L 69/22
370/338

* cited by examiner

METHOD FOR PERFORMING BIT LEVEL MANAGEMENT IN A WIRELESS LOCAL AREA NETWORK SYSTEM, AND ASSOCIATED TRANSMITTER AND RECEIVER

BACKGROUND OF THE INVENTION

1. Field of the Invention

The present invention is related to wireless local area network, and more particularly, to a method for performing bit level management in a wireless local area network system, and a transmitter and a receiver.

2. Description of the Prior Art

In a wireless local area network (WLAN) system (e.g. a WLAN system conforming to IEEE 802.11ax standard), different formats of packets may comprise different padding fields, where the related art architecture may fill redundant data into the aforementioned different padding fields, to satisfy various requirements for data communications. However, the redundant data is usually meaningless. Thus, there is a need for a novel method to perform further management, in order to prevent waste of communications resources, and further improve overall performance of the WLAN system.

SUMMARY OF THE INVENTION

An objective of the present invention is to provide a method for performing bit level management in a wireless local area network (WLAN) system, and a transmitter and a receiver, in order to prevent waste of communications resources.

Another objective of the present invention is to provide a method for performing bit level management in a WLAN system, and a transmitter and a receiver, to improve overall performance of the WLAN system without introducing a side effect or in a way that is less likely to introduce a side effect.

At least one embodiment of the present invention provides a method for performing bit level management in a WLAN system. The method comprises: calculating respective bit counts of one or more padding fields located in one or more locations within a packet in a transmitter within the WLAN system, respectively; and according to the respective bit counts of the one or more padding field, filling one or more sets of valid data corresponding to at least one predetermined bit count into the one or more padding fields, to replace one or more sets of redundant data. In addition, in response to a receiver within the WLAN system receiving the packet that has the one or more sets of valid data, the WLAN system utilizes the one or more sets of valid data to enhance overall performance of the WLAN system.

At least one embodiment of the present invention provides a transmitter for a WLAN system. The transmitter may comprise a processing circuit, a scrambler and an encoder, where the scrambler is coupled to the processing circuit, and the encoder is coupled to the scrambler. The processing circuit is arranged to calculate respective bit counts of one or more padding fields located in one or more locations within a packet, respectively. Additionally, the processing circuit selects one or more sets of valid data corresponding to at least one predetermined bit count according to the respective bit counts of the one or more padding fields. The scrambler scrambles a set of valid data within the one or more sets of valid data according to a random seed, to generate scrambled valid data. The encoder is arranged to encode the scrambled valid data to generate padding data for being filled into a padding field within the one or more padding fields, where the padding data represents the set of valid data.

At least one embodiment of the present invention provides a receiver for a WLAN system. The receiver may comprise a decoder, a descrambler and a processing circuit, where the descrambler is coupled to the decoder, and the processing circuit is coupled to the descrambler. After the receiver receives a packet, the decoder decodes padding data within a padding field within one or more padding fields respectively located in one or more locations within the packet, to generate decoded data. The descrambler descrambles the decoded data according to a random seed, to generate a set of data. The processing circuit determines whether the set of data is valid data according to a subset of the set of data.

One of advantages of the present invention is, the present invention method can properly utilize the aforementioned one or more padding fields to transmit the aforementioned one or more sets of valid data, to enhance the overall performance of the WLAN system. In addition, implementing according to embodiments of the present invention will not greatly increase additional costs. Thus, the present invention can improve the overall performance of the WLAN system without introducing a side effect or in a way that is less likely to introduce a side effect.

These and other objectives of the present invention will no doubt become obvious to those of ordinary skill in the art after reading the following detailed description of the preferred embodiment that is illustrated in the various figures and drawings.

DETAILED DESCRIPTION

In a wireless local area network (WLAN) system conforming to IEEE 802.11ax standard, when an access point (AP), such as a wireless network base station or a wireless network sharing device, is going to transmit data to multiple stations (STAs) such as client stations (e.g. a multifunctional cell phone or a laptop computer), the data may be transmitted through a high efficiency (HE) multi-user (MU) physical layer convergence procedure (PLCP) protocol data unit (PPDU).

Figure 1:
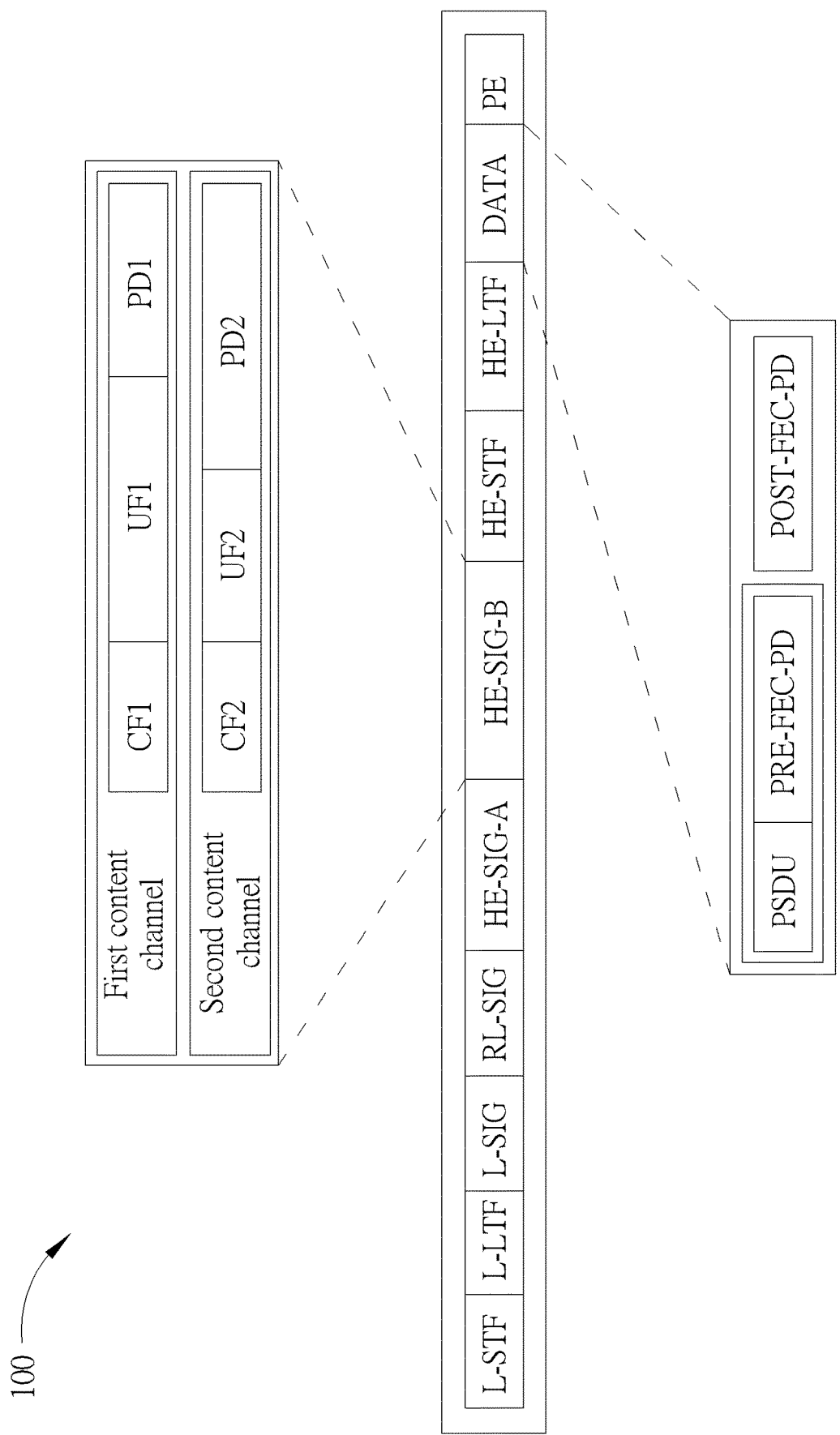
FIG. 1 is a diagram illustrating a packet format of a HE MU PPDU according to an embodiment of the present invention.

FIG. 1 is a diagram illustrating a packet format 100 of a HE MU PPDU according to an embodiment of the present invention, where the packet format 100 may comprise a plurality of fields such as fields {L-STF, L-LTF, L-SIG, RL-SIG, HE-SIG-A, HE-SIG-B, HE-STF, HE-LTF, DATA, PE}. The plurality of fields may comprise various padding fields. For example, a HE signal (HE-SIG) field may comprise a HE-SIG field A such as the field {HE-SIG-A} and a HE-SIG field B such as the field {HE-SIG-B}, where the field {HE-SIG-B} may comprise a first content channel and a second content channel, which are coded in unit of 20 MHz in frequency domain. Any of the first content channel and the second content channel may further comprise a common field (such as fields {CF1} or {CF2}), a user field (such as fields {UF1} or {UF2}) and a padding field (such as fields {PD1} or {PD2}). In addition, the data field {DATA} may comprise fields {PSDU, PRE-FEC-PD, POST-FEC-PD}, where the field {PSDU} may represent a PLCP service data unit (PSDU), the field {PRE-FEC-PD} may represent a pre-forward error correction (pre-FEC) padding field within the data field {DATA}, and the field {POST-FEC-PD} may represent a post-forward error correction (post-FEC) padding field within the data field {DATA}. In addition, the field {PE} may represent a padding field for packet extension. Those skilled in the art should understand respective purposes of all fields shown in FIG. 1, and therefore related details are omitted, for brevity.

In some embodiments, a transmitter within the WLAN system may fill redundant data into the fields {PD1, PD2, PRE-FEC-PD, POST-FEC-PD, PE} to make up required bit count(s), where the filled redundant data may be dummy data. In order to further enhance overall performance of the WLAN system, the present invention method replaces the redundant data with valid data, to provide a receiver within the WLAN system with various types of information to enhance the overall performance.

Figure 2:
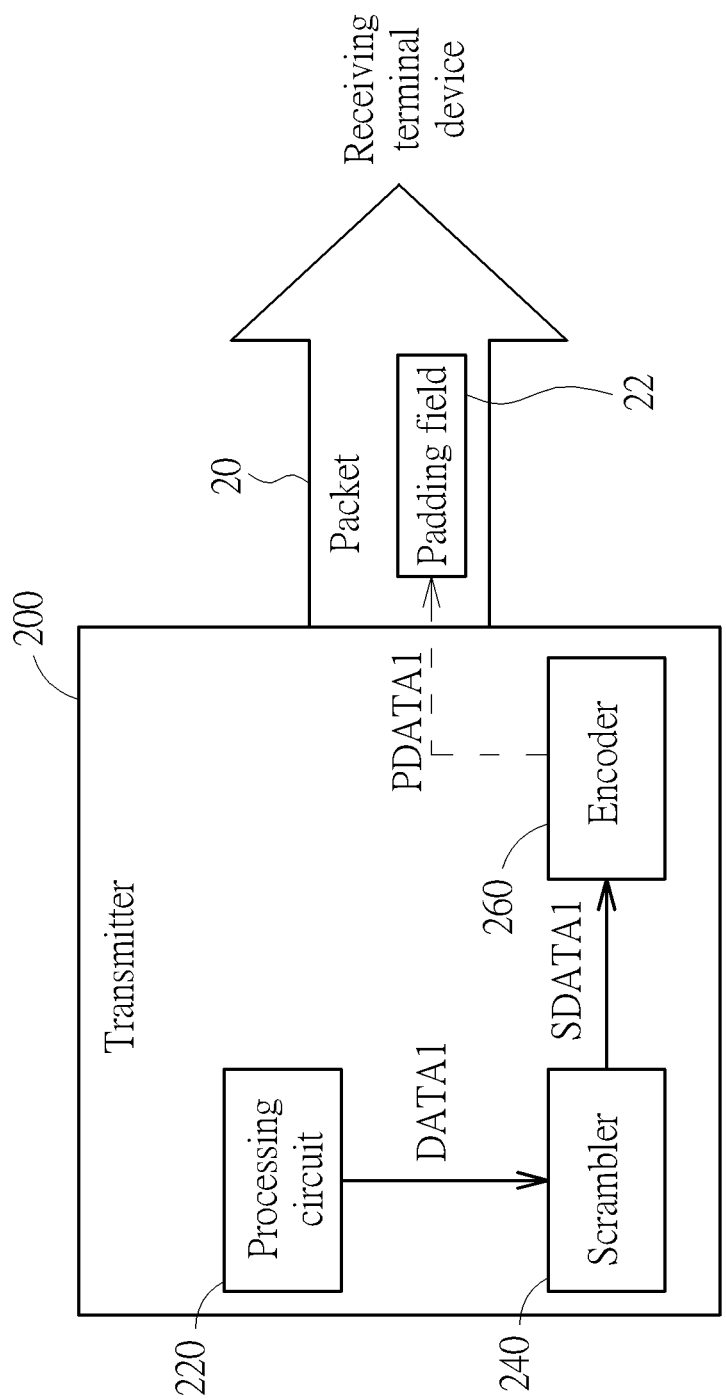
FIG. 2 is a diagram illustrating a transmitter according to an embodiment of the present invention.

FIG. 2 is a diagram illustrating a transmitter 200 according to an embodiment of the present invention, where the transmitter 200 may be an example of a transmitter within the AP, but the present invention is not limited thereto. The transmitter 200 may comprise a processing circuit 220, a scrambler 240 and an encoder 260, where the scrambler 240 is coupled to the processing circuit 220, and the encoder 260 is coupled to the scrambler 240. As shown in FIG. 2, the transmitter 200 may transmit a packet 20 to a receiving terminal device (e.g. any of the multiple STAs). The packet 20 may comprise a padding field 22, where the padding field 22 may comprise one or more of the fields {PD1, PD2, PRE-FEC-PD, POST-FEC-PD, PE} shown in FIG. 1.

Figure 3:
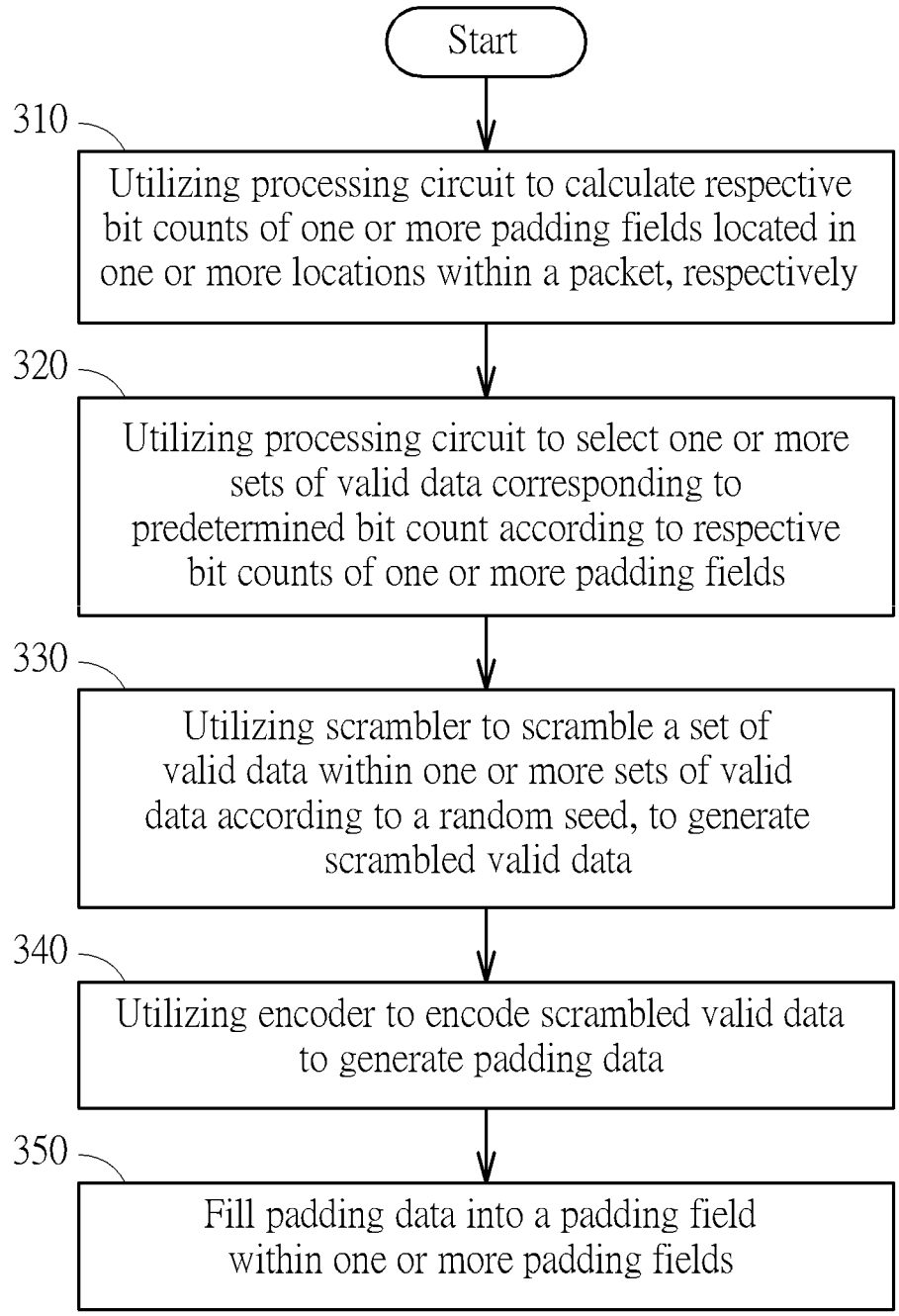
FIG. 3 illustrates a working flow of the transmitter shown in FIG. 2 according to an embodiment of the present invention.

Please refer to FIG. 3 in conjunction with FIG. 2, where FIG. 3 illustrates a working flow of the transmitter 200 shown in FIG. 2 according to an embodiment of the present invention.

In Step 310, the processing circuit 220 may calculate respective bit counts of one or more padding fields located in one or more locations within a packet, respectively, such as respective bit counts of the one or more of the fields {PD1, PD2, PRE-FEC-PD, POST-FEC-PD, PE} shown in FIG. 1. For example, regarding the padding field for the packet extension (such as the field {PE}), a bit count $L_{padding}$ of the fields {PE} may be obtained through the following equations:

$$N_{SYM,PE} = T_{PE}/(T_{IDFT,us} + T_{GI,PE});$$

$$L_{padding} = N_{SYM,PE} * N_{DBPS,PE};$$

where $T_{PE}$, $T_{IDFT,us}$ and $T_{GI,PE}$ represent time periods for the packet extension, Inverse Discrete Fourier Transform and guard interval, respectively, $N_{SYM,PE}$ represents a symbol count of the packet extension, and $N_{DBPS,PE}$ represents a bit count of a packet extension symbol. Those skilled in the art should understand how to calculate bit counts of other fields (such as the fields {PD1, PD2, PRE-FEC-PD, POST-FEC-PD, PE} shown in FIG. 1) after reading the above descriptions, and therefore related details are omitted, for brevity.

In Step 320, the processing circuit 220 may select one or more sets of valid data corresponding to a predetermined bit count according to the respective bit counts of the one or more padding fields. For example, as bit counts of the one or more sets of valid data such as valid data {DATA1, DATA2, DATA3} are known information, the processing circuit 220 may select one or more of the valid data {DATA1, DATA2, DATA3} for being filled into a padding field that has enough bit count according to the respective bit counts of the one or more padding fields that are obtained in the Step 310. Please note that, any of the one or more sets of valid data may comprise multiple fields such as an index field, a content field, a cyclic redundancy check (CRC) field and a tail field, to allow the receiving terminal device to recognize this valid data. For example, based on a check or confirmation operation of a CRC code within a CRC field, the receiving terminal device can determine whether a set of data is valid data.

In Step 330, the scrambler 240 may scramble a set of valid data within the one or more sets of valid data according to a random seed (e.g. a seed S), to generate scrambled valid data. For example, assuming that the processing circuit 220, in Step 320, selects the valid data {DATA1} to be filled into the field {PE} shown in FIG. 1, the scrambler 240 may scramble the valid data {DATA1} according to the seed S, to generate the scrambled valid data such as data {SDATA1}.

In Step 340, the encoder may encode the scrambled valid data (e.g. the data {SDATA1}) to generate padding data such as data {PDATA1}.

In Step 350, the transmitter 200 (e.g. the processing circuit 220) may fill the padding data (e.g. the data {PDATA1}) into a padding field (e.g. the padding field 22) within the one or more padding fields. As a result, the set of valid data such as the valid data {DATA1} may be transmitted to the receiving terminal device through the padding data {PDATA1} in the padding field 22 (e.g. the padding data {PDATA1} may represent the valid data {DATA1}), to enhance the overall performance.

Figure 4:
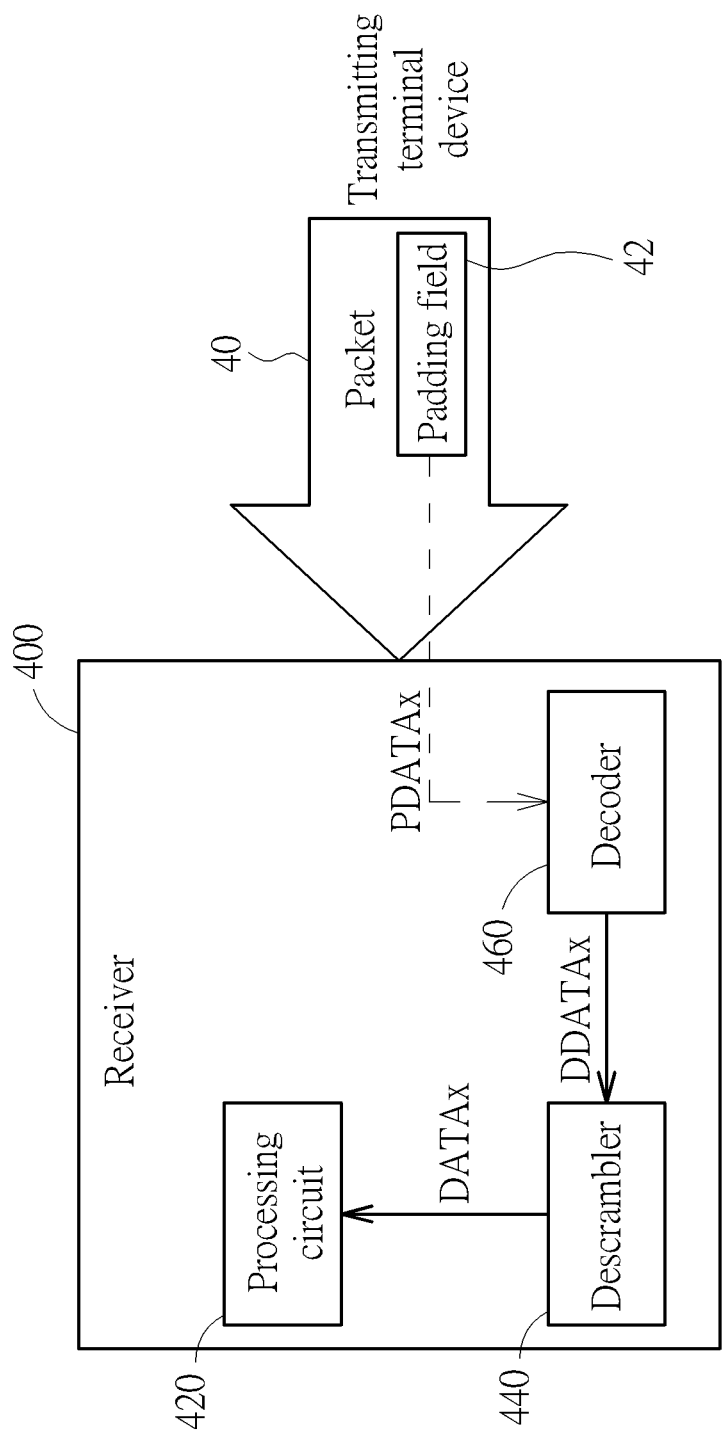
FIG. 4 is a diagram illustrating a receiver according to an embodiment of the present invention.

FIG. 4 is a diagram illustrating a receiver 400 according to an embodiment of the present invention, where the receiver 400 may be an example of a receiver within any of the multiple STAs, but the present invention is not limited thereto. The receiver 400 may comprise a processing circuit 420, a descrambler 440 and a decoder 460, where the descrambler 440 is coupled to the decoder 460, and the processing circuit 420 is coupled to the descrambler 440. As shown in FIG. 4, the receiver 400 may receive a packet 40 from a transmitting terminal device (e.g. any AP near the receiver 400). The packet 40 may comprise a padding field 42, where the padding field 42 may comprise one or more of the fields {PD1, PD2, PRE-FEC-PD, POST-FEC-PD, PE} shown in FIG. 1.

Figure 5:
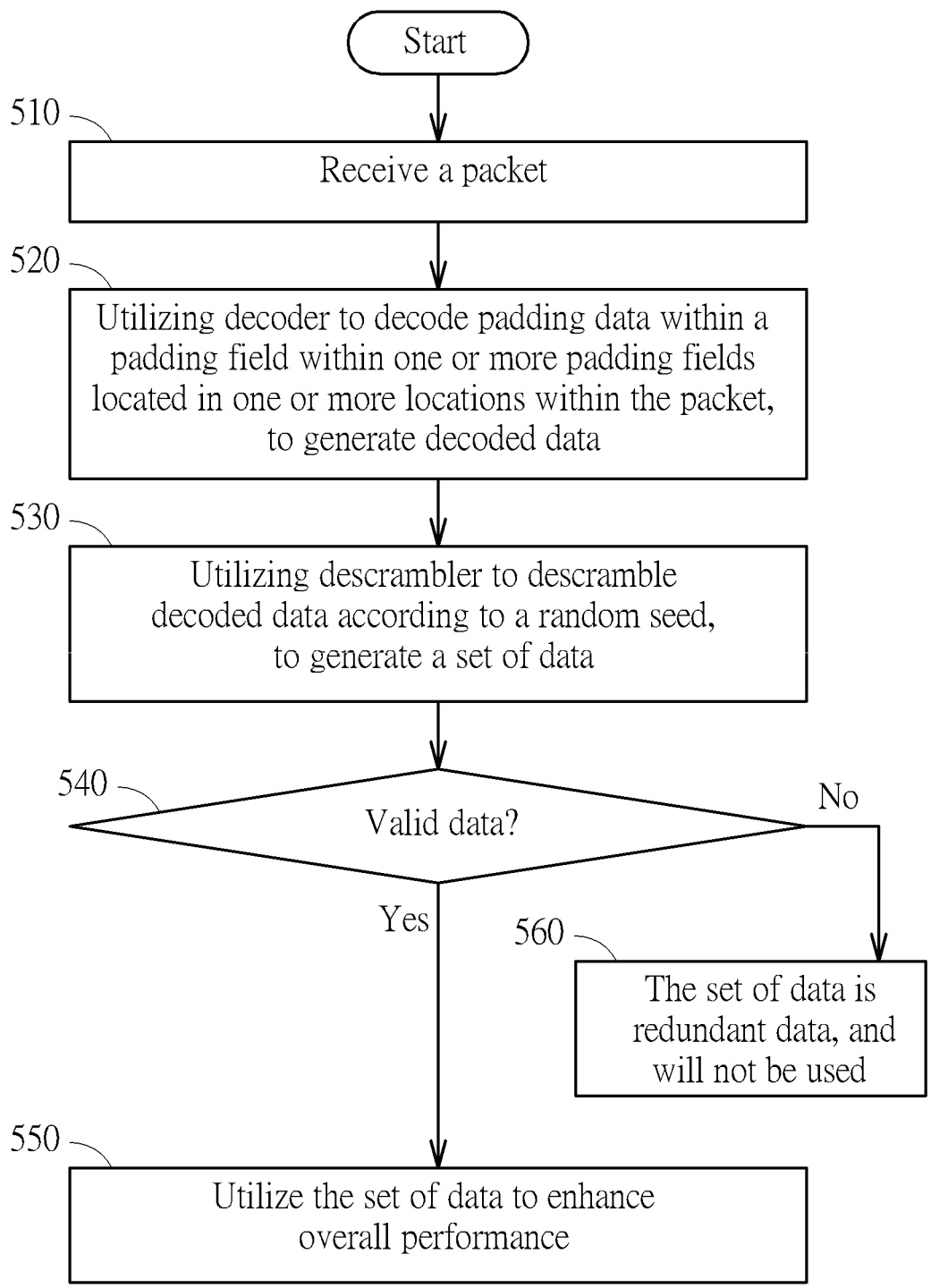
FIG. 5 illustrates a working flow of the receiver shown in FIG. 4 according to an embodiment of the present invention.

Please refer to FIG. 5 in conjunction with FIG. 4, where FIG. 5 illustrates a working flow of the receiver 400 shown in FIG. 4 according to an embodiment of the present invention.

In Step 510, the receiver 400 may receive the packet 40.

In Step 520, the decoder 460 may decode padding data (such as data {PDATAx}) within a padding field within one or more padding fields (such as the padding field 42) located in one or more locations within the packet, to generate decoded data such as data {DDATAx}.

In Step 530, the descrambler 440 may descramble the decoded data such as the data {DDATAx} according to a random seed, to generate a set of data. For example, when the receiver 400 receives a packet from a transmitter (e.g. the transmitter 200 shown in FIG. 2) manufactured by the same manufacturer, the descrambler 440, in Step 530, may descramble the data {DDATAx} according to a random seed same as that utilized in Step 330 (e.g. the seed S), to successfully reconvert the valid data transmitted by the transmitter 200 such as the data {DATA1}.

In Step 540, the processing circuit 420 may determine whether the set of data is valid data according to a subset of the set of data. More particularly, the processing circuit 420 may determine whether the set of data is valid data according to the CRC field within the set of data. When the set of data is valid data, the Step 550 is entered; otherwise, the Step 560 is entered.

When the receiver 400 receives a packet from a transmitter (e.g. the transmitter 200 shown in FIG. 2) manufactured by the same manufacturer, the descrambler 440 may reconvert the data comprising the index field, the content field, the CRC field and the tail field according to the random seed (e.g. the seed S), the set of data such as the data {DATAx} generated by the descrambler 440 may pass a CRC, and the receiver 400 may therefore determine that the set of data is valid data. In comparison with the above, when the receiver 400 receives a packet from a transmitter that is not manufactured by the same manufacturer, the descrambler 440 cannot perform the same operation of reconverting the data comprising the index field, the content field, the CRC field and the tail field according to the random seed (e.g. the seed S) to obtain meaningful information, the set of data such as the data {DATAx} generated by the descrambler 440 may fail to pass the CRC, and the receiver 400 may therefore determine that the set of data is redundant data rather than valid data.

In Step 550, the receiver 400 may utilize the set of data to enhance the overall performance.

In Step 560, the set of data is redundant data, and the receiver 400 will not use it. For example, assuming that the receiver 400 receive a packet from a device (or a transmitter) manufactured by one of other manufacturers, when the receiver 400 interprets the set of data as padding bits within padding field(s), data within these padding bits may be automatically ignored. Thus, there is no inter-operability test problem.

According to an embodiment of the present invention, the one or more sets of valid data may comprise one or more of available channel information of at least one available channel near the WLAN system, transmission power weightings for a plurality of receivers, interference information, back off time information, and contention window information. In this embodiment, the WLAN system can increase accuracy of channel estimation with aid of the transmission power weightings, or, the WLAN system can transmit one or more of the interference information, the back off time information, and the contention window information through the one or more padding fields, to reduce a number of times for handshaking. In another embodiment, the WLAN system can enhance long-term performance of a basis service set (BSS), for example, long-term statistics information or resource allocation.

Figure 6:
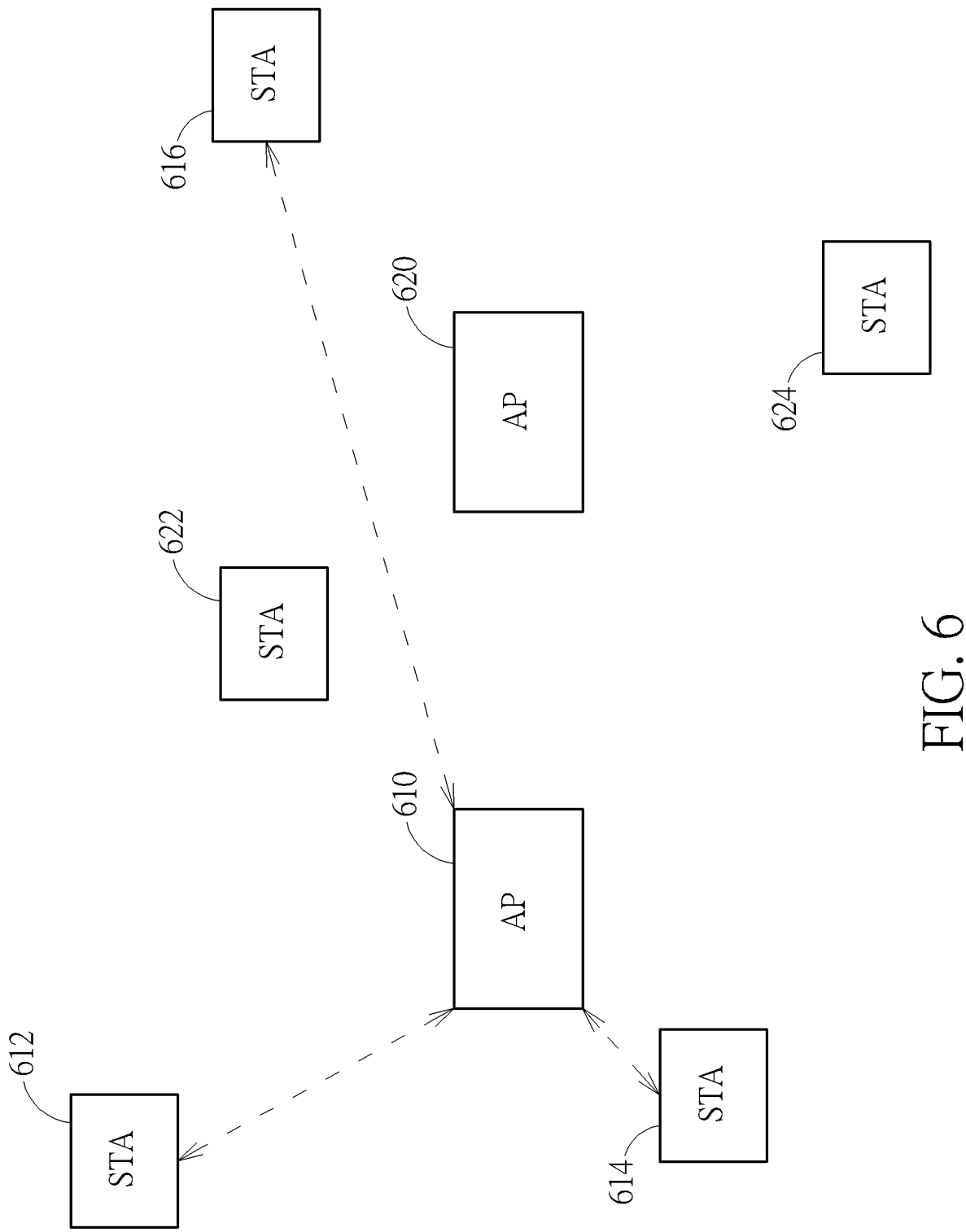
FIG. 6 is a diagram illustrating a WLAN system according to an embodiment of the present invention.

FIG. 6 is a diagram illustrating a WLAN system according to an embodiment of the present invention. As shown in FIG. 6, there are two APs in this area, comprising AP 610 and 620, where examples of the APs 610 and 620 may include, but are not limited to: a wireless network base station and/or a wireless network sharing device. In this embodiment, the AP 610 is an AP comprising the present invention transmitter (e.g. the transmitter 200), and the AP 620 is a typical AP. In addition, each of STAs 612, 614 and 616 is a STA comprising the present invention receiver (e.g. the receiver 400), and STAs 622 and 624 are typical STAs, where examples of any of the STAs 612, 614, 616, 622 and 624 may include, but are not limited to: a multifunctional cell phone, a laptop computer, a tablet, a wearable electronic device, etc.

Additionally, in comparison with IEEE 802.11ac standard, the main feature of IEEE 802.11ax standard is Orthogonal Frequency Division Multiple Access (OFDMA), and when a specific STA receives a HE MU PPDU from an AP, the specific STA may only need to receive resource units (RUs) corresponding to the STA itself. Since a minimum transmission unit of a RU is 26 subcarriers, after preliminary channel estimation of HE long training field (HE-LTF) is finished, a transmitter within the specific STA might not have enough information to perform further channel smoothing for obtaining channel estimation with high accuracy without utilizing the present invention method. According to an embodiment of the present invention, the specific STA may utilize subcarrier information of RU(s) corresponding to other STA (s) near the specific STA, to provide a great amount of information for channel smoothing. As a result, the specific STA can increase accuracy of channel estimation of the RUs on channel edge subcarriers for itself. For example, distances between the STAs {612, 614, 616, 622, 624} and the AP 610 may be different, and regarding STAs with different distances, magnitudes of energy of corresponding RUs may be different. Thus, one of applications of the present invention method is, the AP 610 may fill RU power boost factors corresponding to a portion or all of nearby STAs (e.g. a portion or all of the STAs 612, 614, 616, 622 and 624, referred to as the nearby STAs, for brevity) into the field {HE-SIG-B} shown in FIG. 1, to allow the receiving terminal device to know a power ratio of RUs corresponding to a portion or all of nearby STAs. As a result, any of the STAs 612, 614 and 616 may perform channel smoothing according to the RU power boost factors corresponding to the nearby STAs. After power (e.g. power of the RUs) is normalized, subcarrier information amount may increase, and the purpose of increasing accuracy of channel estimation can be achieved. Thus, performance of current receiving operation(s) of the receiving terminal device (e.g. any of the STAs 612, 614 and 616) can be improved.

In addition, since the fields {PE} and {POST-FEC-PD} shown in FIG. 1 are arranged to provide enough time for processing the packet and responding confirmation signal or feedback signal, it is suggested to fill the fields {PE} and {POST-FEC-PD} with the long-term statistics information rather than information associated with the current receiving operation(s), to enhance long-term performance. For example, the field {PE} may utilize the same modulation as the field {HE-SIG-A} to carry messages such as overlapping BSS (OBSS) information, traffic information, transmission power, etc. Additionally, when the AP 610 is transmitting a packet, the field {PE} of this packet may carry enhanced distributed channel access (EDCA) parameters to reduce conflict probability between devices (e.g. two or more of the STAs 612, 614 and 616) manufactured by the same manufacturer.

Additionally, in a WLAN system conforming to IEEE 802.11ac, data or a packet transmitted from an AP to a STA may comprise a pre-FEC padding field of a very high throughput data (VHT-DATA) field. In some embodiment, the AP may utilize the pre-FEC padding field to carry valid data (such as one or more of the one or more sets of valid data in some of the above embodiments) to enhance the overall performance, but the present invention is not limited thereto.

Figure 7:
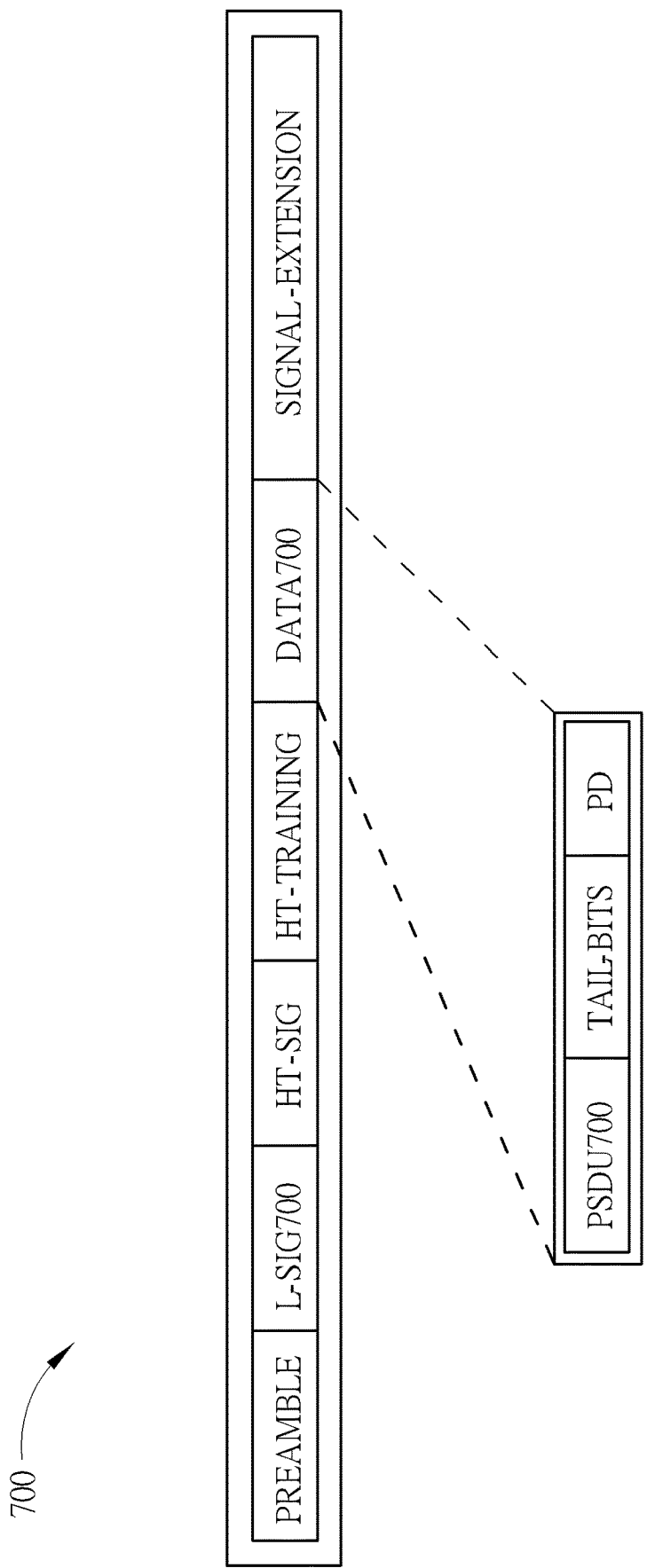
FIG. 7 is a diagram illustrating a packet format of a PPDU according to an embodiment of the present invention.

Please note that, embodiments of the present invention may also be applied to any architecture conforming to IEEE 802.11a, 802.11g or 802.11n standards. Taking IEEE 802.11n standard as an example, FIG. 7 is a diagram illustrating a packet format 700 of a PPDU conforming to IEEE 802.11n according to an embodiment of the present invention. The packet 700 may comprise fields {PREAMBLE, L-SIG700, HT-SIG, HT-TRAINING, DATA700, SIGNAL-EXTENSION}, and data field {DATA700} may comprise fields {PSDU700, TAIL-BITS}. When a WLAN system (e.g. a WLAN system conforming to IEEE 802.11n standard) utilizes binary convolutional coding (BCC), a tail portion of the data field {DATA} (e.g. the following field of the field {TAIL-BITS}) may further comprise a tail padding field such as the field {PD}, where the field {PD} is not defined in standard (e.g. IEEE 802.11n standard), and in general, a receiver (e.g. a receiver conforming to IEEE 802.11n standard) may not input data within the field {PD} into a decoder within the receiver to decode the data. In an embodiment of the present invention, an AP within this WLAN system may utilize the tail padding field to carry valid data (such as the one or more of the one or more sets of valid data) to enhance the overall performance. Additionally, those skilled in the art should understand respective usages of other fields such as fields {PREAMBLE, L-SIG700, HT-SIG, HT-TRAINING, SIGNAL-EXTENSION, PSDU700, TAIL-BITS} shown in FIG. 7, and therefore related details are omitted, for brevity.

To summarize, the present invention method can replace redundant data with valid data, to utilize space of these padding fields for transmitting the valid data in order to enhance the overall performance. For example, in comparison with transmission (e.g. data transmission) that utilizes the typical AP (such as the AP 620) or STA (such as the STAs 622 and 624), transmission between AP 610 and STA {612, 614, 616}, for example, transmission between an AP and a STA that are manufactured by the same manufacturer, can utilize the valid data carried by these padding fields to enhance transmission performance. In addition, there is no inter-operability test problem between the present invention device (such as the transmitter 200 or the receiver 400) and typical devices (such as a transmitter within the AP 620 or a receiver within any of the STAs 622 and 624). Thus, the present invention can improve the overall performance of the WLAN system without introducing a side effect or in a way that is less likely to introduce a side effect.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for performing bit level management in a wireless local area network (WLAN) system, comprising:
    calculating respective bit counts of one or more padding fields located in one or more locations within a packet in a transmitter within the WLAN system, respectively; and
    according to the respective bit counts of the one or more padding field, filling one or more sets of valid data corresponding to at least one predetermined bit count into the one or more padding fields, to utilize the one or more padding field to carry the one or more sets of valid data, wherein the one or more sets of valid data comprise information of the WLAN system, and the step of filling the one or more sets of valid data corresponding to said at least one predetermined bit count into the one or more padding fields comprises:
        scrambling a set of valid data within the one or more sets of valid data through a scrambler within the transmitter according to a random seed, to generate scrambled valid data; and
        encoding the scrambled valid data through an encoder within the transmitter to generate padding data for being filled into a padding field within the one or more padding fields, wherein the padding data represents at least one portion of the one or more sets of valid data;
    after the receiver receives the packet, decoding the padding data within the padding field through a decoder within the receiver, to generate decoded data;
    descrambling the decoded data through a descrambler within the receiver according to the random seed, to generate a set of data; and
    according to a subset of the set of data, determining whether the set of data is valid data.

2. The method of claim 1, wherein the one or more padding fields are utilized at least for a tail of a data field of the packet.

3. The method of claim 1, wherein the one or more padding fields are utilized for a pre-forward error correction (pre-FEC) padding field of a very high throughput data (VHT-DATA) field of the packet.

4. The method of claim 1, wherein the one or more padding fields comprise one or more of a padding field of a high efficiency signal (HE-SIG) field, a pre-forward error correction (pre-FEC) padding field of a data field, a post-forward error correction (post-FEC) padding field of the data field, and a packet extension within the packet.

5. The method of claim 1, wherein the one or more sets of valid data comprises one or more of available channel information of at least one available channel near the WLAN system, transmission power weightings for a plurality of receivers, interference information, back off time information, and contention window information.

6. The method of claim 5, wherein the step of utilizing the one or more sets of valid data to enhance the overall performance of the WLAN system comprises:
    increasing accuracy of channel estimation with aid of the transmission power weightings.

7. The method of claim 5, wherein the step of utilizing the one or more sets of valid data to enhance the overall performance of the WLAN system comprises:
    transmitting one or more of the interference information, the back off time information, and the contention window information through the one or more padding fields, to reduce a number of times for handshaking.

8. A transmitter for a wireless local area network (WLAN) system, comprising:
    a processing circuit, arranged to calculate respective bit counts of one or more padding fields located in one or more locations within a packet, respectively, wherein the processing circuit selects one or more sets of valid data corresponding to at least one predetermined bit count according to the respective bit counts of the one or more padding fields, wherein the one or more sets of valid data comprise information of the WLAN system;

a scrambler, coupled to the processing circuit, wherein the scrambler scrambles a set of valid data within the one or more sets of valid data according to a random seed, to generate scrambled valid data; and an encoder, coupled to the scrambler, arranged to encode the scrambled valid data to generate padding data for being filled into a padding field within the one or more padding fields, wherein the padding data represents the set of valid data;

wherein after a receiver receives the packet, the padding data within the padding field is decoded through a decoder within the receiver, to generate decoded data; the decoded data is descrambled through a descrambler within the receiver according to the random seed, to generate a set of data; and according to a subset of the set of data, the receiver determines whether the set of data is valid data.

9. The transmitter of claim 8, wherein the one or more padding fields are utilized for a pre-forward error correction (pre-FEC) padding field of a very high throughput data (VHT-DATA) field of the packet.

10. The transmitter of claim 8, wherein the one or more padding fields comprise one or more of a padding field of a high efficiency signal (HE-SIG) field, a pre-forward error correction (pre-FEC) padding field of a data field, a post-forward error correction (post-FEC) padding field of the data field, and a packet extension within the packet.

11. The transmitter of claim 8, wherein the one or more sets of valid data comprises one or more of available channel information of at least one available channel near the WLAN system, transmission power weightings for a plurality of receivers, interference information, back off time information, and contention window information.

12. A receiver for a wireless local area network (WLAN) system, comprising:

a decoder, wherein, after the receiver receives a packet, the decoder decodes padding data within a padding field within one or more padding fields respectively located in one or more locations within the packet, to generate decoded data;

a descrambler, coupled to the decoder, wherein the descrambler descrambles the decoded data according to a random seed, to generate a set of data; and a processing circuit, coupled to the descrambler, wherein the processing circuit determines whether the set of data is valid data comprising information of the WLAN system according to a subset of the set of data;

wherein when the random seed is the same as that being utilized by a transmitter which transmits the packet, the descrambler reconverts the set of data comprising the subset of the set of data, and when the random seed is not the same as that being utilized by the transmitter, the descrambler is unable to reconvert the set of data comprising the subset of the set of data.

13. The receiver of claim 12, wherein the one or more padding fields are utilized for a pre-forward error correction (pre-FEC) padding field of a very high throughput data (VHT-DATA) field of the packet.

14. The receiver of claim 12, wherein the one or more padding fields comprise one or more of a padding field of a high efficiency signal (HE-SIG) field, a pre-forward error correction (pre-FEC) padding field of a data field, a post-forward error correction (post-FEC) padding field of the data field, and a packet extension within the packet.

15. The receiver of claim 12, wherein the valid data comprises one or more of available channel information of at least one available channel near the WLAN system, transmission power weightings for a plurality of receivers, interference information, back off time information, and contention window information.

16. The receiver of claim 15, wherein the processing circuit enhances accuracy of channel estimation with aid of the transmission power weightings.

17. The receiver of claim 15, wherein the receiver receives one or more of the interference information, the back off time information, and the contention window information through the padding field, to reduce a number of times for handshaking.

* * * * *